US012572854B2

(12) United States Patent
Doddala et al.

(10) Patent No.: US 12,572,854 B2
(45) Date of Patent: Mar. 10, 2026

(54) ROOT CAUSE DISCOVERY ENGINE

(71) Applicant: Cisco Technology, Inc., San Jose, CA (US)

(72) Inventors: Harish Doddala, San Jose, CA (US); Tian Bu, Basking Ridge, NJ (US); Tej Redkar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/180,097

(22) Filed: Mar. 7, 2023

(65) Prior Publication Data

US 2023/0289661 A1    Sep. 14, 2023

Related U.S. Application Data

(63) Continuation of application No. 17/481,297, filed on Sep. 21, 2021, now Pat. No. 11,954,568, which is a continuation of application No. 15/492,136, filed on Apr. 20, 2017, now Pat. No. 11,132,620.

(51) Int. Cl.
*G06N 20/00*        (2019.01)
*H04L 41/16*        (2022.01)

(52) U.S. Cl.
CPC ............. *G06N 20/00* (2019.01); *H04L 41/16* (2013.01)

(58) Field of Classification Search
CPC .......... G06N 20/00; H04L 41/14; H04L 41/16
See application file for complete search history.

(56) References Cited

U.S. PATENT DOCUMENTS

| | | | |
|---|---|---|---|
| 5,633,800 | A | 5/1997 | Bankert et al. |
| 8,001,527 | B1 | 8/2011 | Qureshi et al. |
| 8,015,139 | B2 | 9/2011 | Bahl et al. |
| 10,230,749 | B1 | 3/2019 | Rostami-Hesarsorkh et al. |
| 2007/0143718 | A1 | 6/2007 | Abercrombie et al. |
| 2008/0183704 | A1 | 7/2008 | Miller et al. |
| 2009/0117673 | A1 | 5/2009 | Matsushita et al. |
| 2009/0210371 | A1 | 8/2009 | Laan |

(Continued)

FOREIGN PATENT DOCUMENTS

| | | |
|---|---|---|
| CN | 105471659 A | 4/2016 |
| CN | 105634787 A | 6/2016 |

(Continued)

OTHER PUBLICATIONS

Dimopoulos et al. ("Identifying the Root Cause of Video Streaming Issues on Mobile Devices", CoNEXT '15 Dec. 1-4, 2015, Heidelberg, Germany) (Year: 2015).*

(Continued)

*Primary Examiner* — Imad Kassim
(74) *Attorney, Agent, or Firm* — Polsinelli P.C.

(57) ABSTRACT

The disclosed technology relates identifying causes of an observed outcome. A system is configured to receive an indication of a user experience problem, wherein the user experience problem is associated with observed operations data including an observed outcome. The system generates, based on the observed operations data, a predicted outcome according to a model, determines that the observed outcome is within range of the predicted outcome, and identifies a set of candidate causes of the user experience problem when the observed outcome is within range of the predicted outcome.

24 Claims, 8 Drawing Sheets

(56) References Cited

U.S. PATENT DOCUMENTS

| | | | |
|---|---|---|---|
| 2010/0023307 A1* | 1/2010 | Lee | G06F 18/2321 |
| | | | 703/7 |
| 2012/0066547 A1 | 3/2012 | Gilbert et al. | |
| 2012/0116850 A1* | 5/2012 | Abe | G06Q 10/067 |
| | | | 705/7.38 |
| 2012/0259587 A1 | 10/2012 | Sannino et al. | |
| 2012/0290879 A1 | 11/2012 | Shibuya et al. | |
| 2014/0122691 A1* | 5/2014 | Simhon | H04L 41/147 |
| | | | 709/224 |
| 2015/0274314 A1 | 10/2015 | Conrad | |
| 2015/0310332 A1 | 10/2015 | Kupershtok et al. | |
| 2015/0378805 A1 | 12/2015 | Nakano et al. | |
| 2016/0034502 A1 | 2/2016 | Dupey et al. | |
| 2016/0065419 A1* | 3/2016 | Szilagyi | G06F 11/3006 |
| | | | 709/224 |
| 2016/0209831 A1 | 7/2016 | Pal | |
| 2016/0373306 A1 | 12/2016 | Saha et al. | |
| 2017/0019291 A1 | 1/2017 | Tapia et al. | |
| 2017/0091671 A1 | 3/2017 | Mitarai | |
| 2017/0251003 A1 | 8/2017 | Rostami-Hesarsorkh et al. | |
| 2017/0269981 A1* | 9/2017 | Schellenberger | G06F 11/0769 |
| 2017/0293858 A1* | 10/2017 | Larsen | G06N 5/022 |
| 2017/0302505 A1* | 10/2017 | Zafer | H04L 41/0631 |
| 2017/0302540 A1 | 10/2017 | Monahan et al. | |
| 2017/0329660 A1* | 11/2017 | Salunke | G06F 11/3409 |
| 2017/0371305 A1 | 12/2017 | Tiwari et al. | |
| 2018/0032940 A1 | 2/2018 | Trenchard et al. | |
| 2018/0115455 A1* | 4/2018 | Serrano Garcia | H04L 43/0817 |
| 2018/0146612 A1 | 5/2018 | Sauder et al. | |
| 2018/0160237 A1 | 6/2018 | Rosenthal et al. | |
| 2018/0218306 A1 | 8/2018 | Rosu et al. | |
| 2019/0114513 A1* | 4/2019 | Mei | G06F 40/253 |
| 2019/0318288 A1 | 10/2019 | Noskov et al. | |

FOREIGN PATENT DOCUMENTS

| | | |
|---|---|---|
| CN | 105873105 A | 8/2016 |
| WO | 2003/005200 | 1/2003 |
| WO | 2016/068926 | 5/2016 |

OTHER PUBLICATIONS

International Search Report and Written Opinion from the International Searching Authority, mailed Aug. 7, 2018, 10 pages, for corresponding International Patent Application No. PCT/US2018/028059.

Chigurupati A., et al., "Root Cause Analysis Using Artificial Intelligence," Annual Reliability and Maintainability Symposium, 2017, 5 pages.

First Office Action and Search Report issued by the China National Intellectual Property Administration for corresponding Chinese Patent Application No. 201880026150.6 mailed Oct. 29, 2021, 11 pages.

International Preliminary Report on Patentability for International Application No. PCT/US2018/028059, mailed Oct. 31, 2019, 9 pages.

Yajun X., How to Locate The Root Cause of Faults in Minutes in Complex O&M Scenarios, (with English translation), 17 pages, [Retrieved on Dec. 30, 2021], Retrieved from URL: blog.csdn.net/jiayani/article/details/51685547.

Farshchi M., et al., "Metric Selection and Anomaly Detection for Cloud Operations Using Log and Metric Correlation Analysis", The Journal of Systems and Software, vol. 137, 2016, pp. 531-549.

* cited by examiner

200

600

700

ROOT CAUSE DISCOVERY ENGINE

CROSS-REFERENCE TO RELATED APPLICATION

This application is a continuation of U.S. patent application Ser. No. 17/481,297, filed on Sep. 21, 2021, which in turn, is a continuation of U.S. patent application Ser. No. 15/492,136, filed on Apr. 20, 2017, now granted U.S. Pat. No. 11,132,620, the contents of which are expressly incorporated by reference herein in their entirety.

TECHNICAL FIELD

The subject matter of this disclosure relates generally to the networked entities and, more specifically, to identifying contributing factors to a particular event.

BACKGROUND

An information technology (IT) infrastructure may contain a large number of entities distributed across the network. These entities include, for example, nodes, endpoints, server machines, user machines, virtual machines, containers (an instance of container-based virtualization), and applications. These entities may be organized and interact with one another to perform one or more functions, provide one or more services, and/or support one or more applications.

A thorough understanding of the IT infrastructure is critical for ensuring smooth IT operations, managing troubleshooting problems, detecting anomalous activity in the IT infrastructure (e.g., network attacks and misconfiguration), application and infrastructure security (e.g., preventing network breaches and reducing vulnerabilities), or asset management (e.g., monitoring, capacity planning, consolidation, migration, and continuity planning). Traditional approaches for managing large IT infrastructures require comprehensive knowledge on the part of highly specialized human operators because of the complexities of the interrelationships among the entities. When confronted with a problem in the network, these human operators manually experiment with large datasets to tease out possible causes and eliminate them one by one until an actual cause is found.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
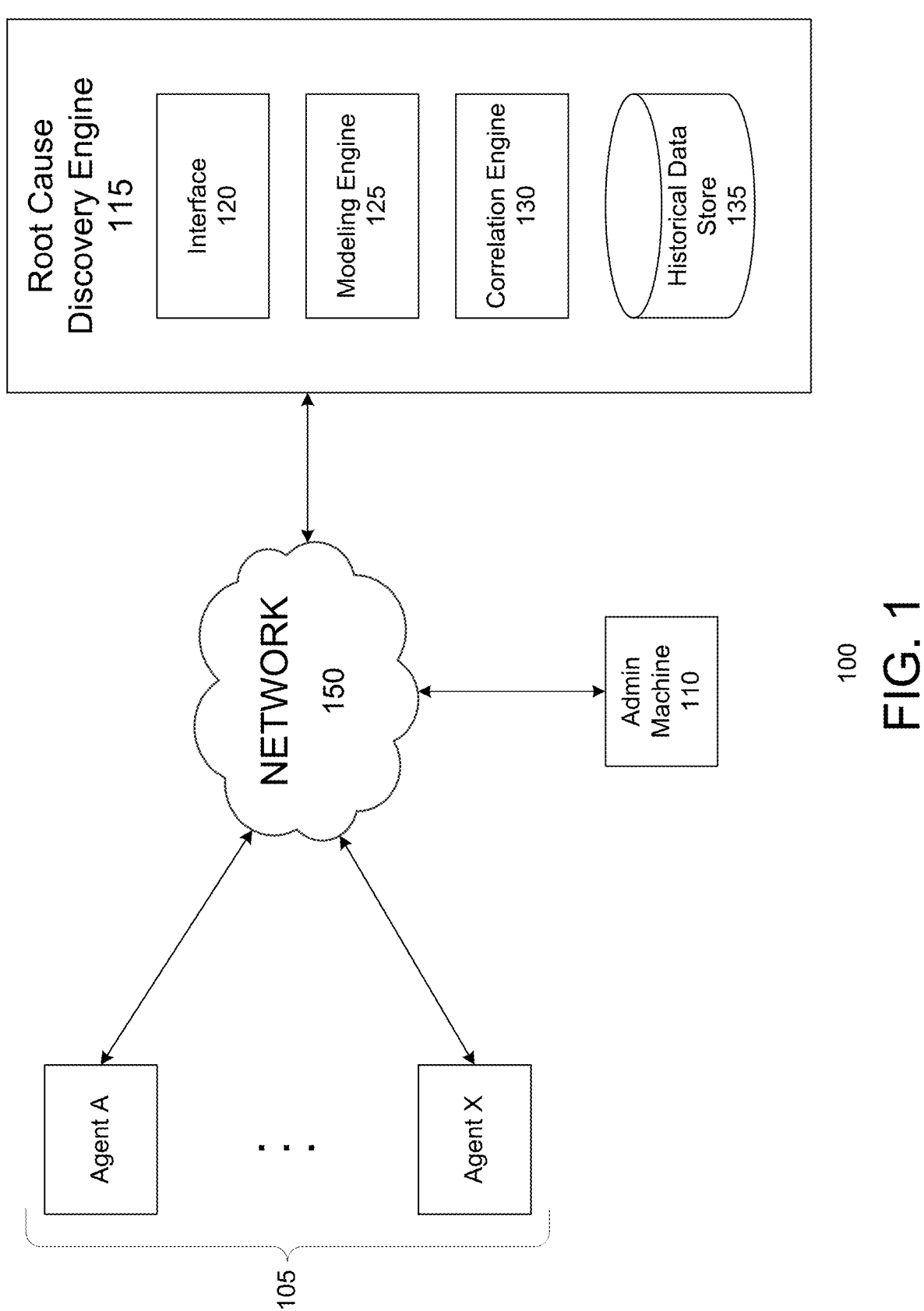
FIG. 1 is a conceptual block diagram illustrating an example IT environment for identifying one or more causes of an outcome, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Networks of entities are often configured to interact with one another to perform one or more functions, provide one or more services, and/or support one or more applications. When an issue comes up with respect to these complex IT infrastructures, a highly specialized human operator (e.g., an IT administrator) with comprehensive knowledge of the complexities and interrelationships among entities is often needed to identify correlated factors. For example, when a problem in the network occurs, an administrator may need to sift through large quantities of data and search for a root cause of the problem. Only when a cause is determined can actions be taken to resolve the issue. Furthermore, as the complexity of the networks increases and technologies such as micro-services and distributed or cloud environments are used, it becomes more and more difficult to perform root cause analysis.

The disclosed technology addresses the need in the art for a more effective way to identify root causes or contributing factors to an observed outcome (e.g., a problem detected by a networked agent, key performance indicator, or other condition). Various aspects of the disclosed technology relate to a root cause discovery engine configured to generate a machine learning model based on operations data and/or a dependency graph to find correlations between certain metrics, events, and/or conditions. These correlations may be based on time (e.g., if they occurred within the same time window), co-occurrence (e.g., how often they occur together), and/or causality (e.g., if one might have potentially contributed to the other).

When an outcome such as a problem detected by a networked agent occurs, data associated with the outcome may be used along with the machine learning model to identify one or more causes or factors for the outcome. The one or more causes or factors for the outcome may be provided to the administrator such that the administrator act based on the provided information. For example, in the case of a problem, the administrator may take actions to resolve the one or more causes of the problem. In some aspects, the root cause discovery engine may automatically take actions to resolve the issue.

Although some aspects described herein relate to root causes of problems, these and other aspects may similarly be applied to identifying causes or factors for other outcomes. These outcomes may include other types of problems and can also include other measured metrics, detected events, or other observable conditions.

DETAILED DESCRIPTION

Various aspects of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Aspects of the subject disclosure relate to a root cause discovery engine configured to identify one or more causes of an outcome based on operations data. The one or more causes may be provided to a user with guidance as to actions that may be taken or additional context with respect to the outcome or the one or more causes.

FIG. 1 is a conceptual block diagram illustrating an example IT environment 100 for identifying one or more causes of an outcome, in accordance with various aspects of the subject technology. Although FIG. 1 illustrates a client-server IT environment 100, other embodiments of the subject technology may include other configurations including, for example, peer-to-peer environments or a single system environment.

The IT environment 100 is shown including at least one networked agent 105, an administrator machine 110, and a root cause discovery engine 115. Each networked agent 105 may be installed on a host network entity and configured to observe and collect data associated with the host network entity and report the collected data to the root cause discovery engine 115. The network entities include, for example, network nodes, endpoints, server machines, user machines, virtual machines, containers (an instance of container-based virtualization), and applications. The network entities may be organized and interact with one another to perform one or more functions, provide one or more services, and/or support one or more applications.

The data collected by the networked agents 105 may include various metrics such as, for example, data related to host entity performance such as CPU usage, memory usage, status of various hardware components, response times for various types of requests or calls, a count of various types of requests or calls, a count of various types of errors, or other metrics. The metrics may be associated with particular events or specific machines or groups of machines. The networked agent 105 may also collect other data related to the host entity such as an entity name, function, department, operating system, entity interface information, file system information, or applications or processes installed or running. Network traffic related data such as, for example, network throughput, a number of network policies being enforced, failed connections, a number of data packets being allowed, dropped, forwarded, redirected, or copied, or any other data related to network traffic.

The networked agents 105 may also collect data associated with various events related to the network entities or the products, services, or functions which they support. The events may include, for example, successful logins, failed logins attempts, changes in data, various warnings, various notices, or updates to certain components or modules. These events may vary based on the type of products, services, or functions which the networked agents 105 provide. For example, for an ecommerce platform, the events may include transactions, adding items for sale, removing items for sale, editing items for sale, price changes, user profile creation or changes.

The data collected by the networked agents 105 may be time series data or data associated with a timestamp. The timestamp may help the networked agent 105 or the root cause discovery engine 115 to generate additional data (e.g., metrics or events) that may be used to identify a cause or factor of an outcome. For example, the networked agent 105 or the root cause discovery engine 115 may generate various counts, averages, max values, min values, median values, or other values over various time scales based on the initially collected information. Additional analytics may also be performed on the data by the networked agents 105 or the root cause discovery engine 115. For example, the data may be compared to other data to determine trends, patterns, or other insights.

The networked agents 105 may transmit the collected data to the root cause discovery engine 115. The root cause discovery engine 115 is shown in FIG. 1 including interface 120, modeling engine 125, correlation engine 130, and historical data store 135. In other embodiments, the root cause discovery engine 115 may include additional components, fewer components, or alternative components. The root cause discovery engine 115 may be implemented as a single machine or distributed across a number of machines in the network.

The interface 120 is configured to communicate with the various entities in the IT environment 100. For example, the interface 120 may receive the collected data, including operations data, from the networked agents 105 and store the collected data in the historical data store 135. The operations data may include any data detected or collected by a networked agent 105 across an information technology (IT) stack. For example, the operations data may include application data for one or more applications running on an entity associated with the networked agent 105, network data detected by the networked agent, database operations data, virtual machine data, security data, or data associated with the physical components of an entity associated with the networked agent 105. In some cases, the collected data stored in the historical data store 135 may grow to a point at which it is difficult to store and inefficient to process read and write operations.

Various embodiments relate to providing technical solutions to these technical problems. In some embodiments, the historical data store 135 may be implemented as a distributed file system such as a Hadoop distributed file system (HDFS). On a HDFS storage implementation, the network policies may be split into a number of large blocks which are then distributed across data stores. The HDFS storage is able to handle very large amounts of data, scalable as additional data stores may be easily added to the framework, and resilient to failure.

However, searching through an entire HDFS store to find specific pieces of data may be cumbersome, time consuming, and resource consuming. Grouping together data based on associated network entities, function, or type and storing the data into separate files may be done to increase efficiency, however this may result in a large number of smaller files, which is difficult for HDFS implementations to handle and inefficient as this results in many seek operations and hopping from node to node to retrieve each small file.

Accordingly, in some embodiments, the distributed file system may use an index to efficiently handle read and writes to the historical data store 135. The index may be any type of database such as a NoSQL database like MongoDB™.

The modeling engine 125 is configured to access the collected data in the historical data store 135 and build a model based on the collected data. For example, the modeling engine 125 may use various machine learning techniques to build a machine learning model. The machine learning model may be configured to identify correlations between different signals in the collected data and may be used to identify one or more causes or contributing factors of a particular outcome such as a user experience problem. According to some aspects, the modeling engine 125 may also use a dependency graph to build the machine learning model.

Figure 2:
FIG. 2 is an illustration showing an example dependency graph, in accordance with various aspects of the subject technology.

FIG. 2 is an illustration showing an example dependency graph 200, in accordance with various aspects of the subject technology. The dependency graph 200 provides a map of associations between various entities, events, and metrics and may be based on domain knowledge about the environment, which may be provided by an administrator. According to various aspects of the subject technology, the dependency graph 200 may be used in some cases to filter out the data used to generate the machine learning model so that signals (e.g., entities, events, and metrics) that are associated with one another are used to build the machine learning model and signals that are not associated are not used. In some aspects, the dependency graph 200 may be used after the model is built to remove correlations that may not be dependent upon each other (e.g., correlations that are coincidences or symptoms of a problem rather than a cause).

In FIG. 2, the dependency graph 200 shows the relationships in an e-commerce environment. For example, the network entities in a IT environment may be configured to provide an e-commerce platform. For example, the network entities may be configured to provide an e-commerce website, process transactions, store item information, store user information, provide accounting services, track shipments, support mobile applications, or provide other functions or services that support the e-commerce platform.

The dependency graph 200 of FIG. 2 shows a portion of the relationships involved in the e-commerce environment. In particular, dependency graph 200 shows the relationships associated with transactions 205 in the e-commerce platform. The transactions 205 may be related with various metrics 210 (e.g., throughput 212, response time 213, and errors per minute 214), errors 215, tags 220, related transactions 225, or other nodes 230 (e.g., events 235 including operational events 240 and security events 245, hosts 250, performance data associated with hosts such as CPU usage 255, network usage 260, or memory usage 265, or combinations thereof).

The correlation engine 130 is configured to use the model generated by the modeling engine 125 to identify one or more causes or factors of an outcome or observed condition. For example, the interface 120 may receive an indication of a problem from an administrator machine 110 or detect a problem based on the data received from the networked agents 105.

Problems detected by networked agents 105, also referred to as user experience problems, may be from anywhere in the IT stack and/or based on operations data collected by the networked agents 105. For example, the user experience problems may be detected in an application layer, a network layer, a database layer, a virtual machine layer, a security layer, or a physical layer in the IT stack. The user experience problem may be associated with observed operations data at or around the time the user experience problem occurred. The correlation engine 130 may convert the observed operations data into a set of observed features and the observed outcome (e.g., a key performance indicator or condition associated with the user experience problem).

The correlation engine 130 may input the observed features into the model and generate a predicted outcome. The model may further output one or more candidate causes or factors of the predicted outcome. The predicted outcome is compared to the observed outcome and the model is validated if the predicted outcome is within range of the observed outcome. If the model is not validated, the model may be unable to determine one or more candidate causes or factors of the user experience problem unless additional settings or changes are made to the model.

If the model is validated, the one or more candidate causes or factors of the predicted outcome are likely to be the candidate causes or factors causing the observed outcome (e.g., the user experience problem). Accordingly, the one or more candidate causes or factors may be provided as candidate causes or factors causing the user experience problem.

Figure 3:
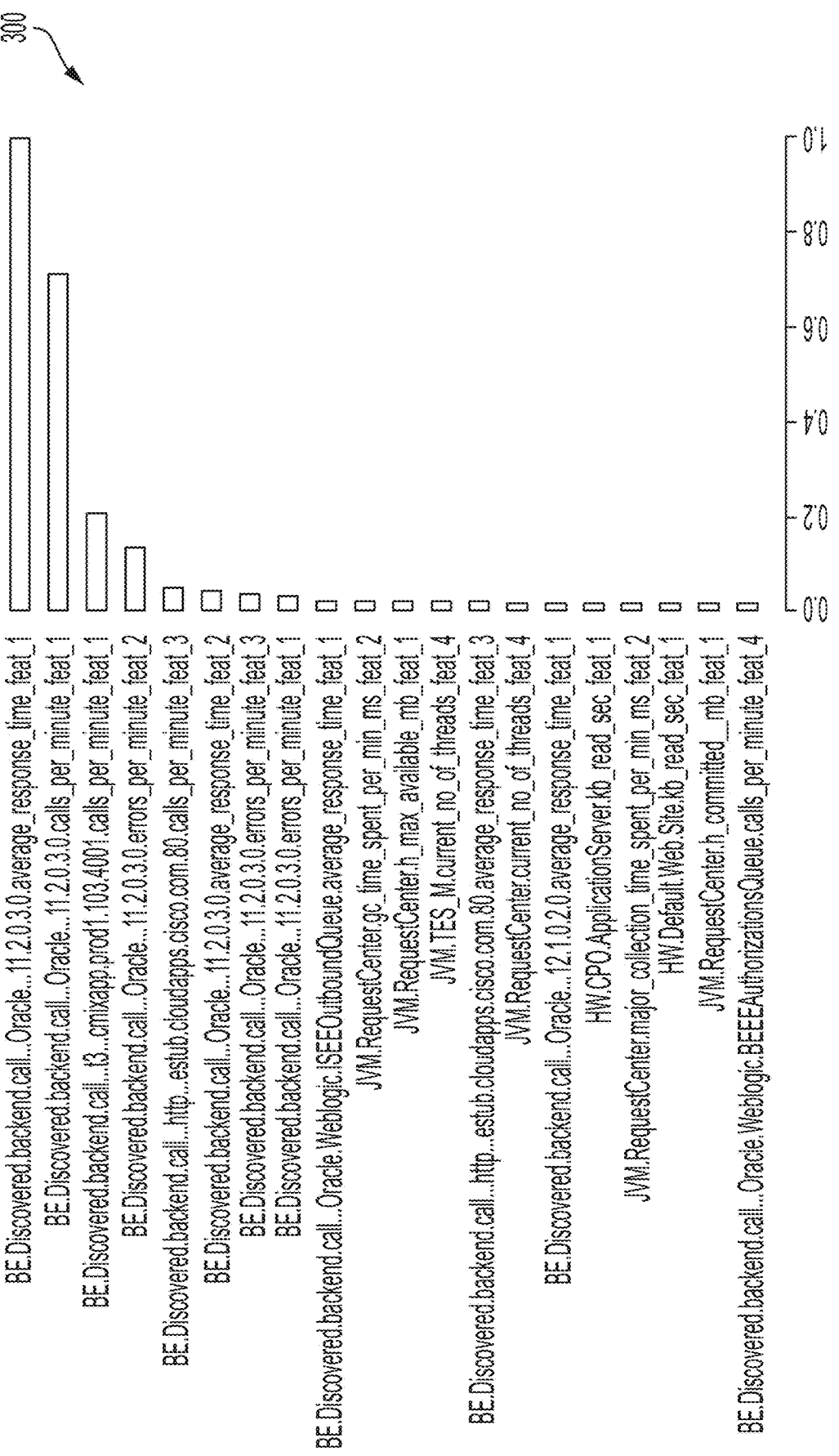
FIG. 3 is a chart illustrating a set of candidate causes, in accordance with various aspects of the subject technology.

FIG. 3 is a chart 300 illustrating a set of candidate causes, in accordance with various aspects of the subject technology. The chart shows a number of candidate causes of an outcome (e.g., a user experience problem) on the left side and their corresponding weights representing the likelihood of each candidate cause being the actual cause on the right side. One or more of the candidate causes may be provided to a user (e.g., an administrator) via the interface 120. These candidate causes represent the most likely candidate causes based on the data stored in the historical data store 135. Additionally, or alternatively, the correlation engine 130 may perform additional analysis to identify an actual cause of the user experience problem.

Each of the candidate causes provided by the machine learning model may correspond to a metric or event that, according to the machine learning model, is correlated to the user experience problem. According to some aspects of the subject technology, the correlation engine 130 may compare the metric or event in the observed operations data corresponding to the candidate cause is compared with a historical value for the metric that is calculated based on the operations data in the historical data store. The historical value for the metric may be an average, median, or range for that metric calculated based on the historic operations data.

If the observed metric is not within range, it is likely that the candidate cause is the actual cause of the user experience problem and the correlation engine 130 may identify the candidate cause as the actual cause of the user experience problem. If the observed metric is within range, it is likely that the candidate cause is not the actual cause of the user experience problem.

In some cases, the correlation engine 130 may process the set of candidate causes in order of most likely (e.g., most heavily weighted) to least likely. Furthermore, the correlation engine 130 may stop when one actual cause is found or continue to process the candidate causes and identify more than one actual causes. The actual causes may then be provided to the user via the interface 120.

The administrator machine 110 may provide a user (e.g., an administrator) with one way to interact with the root cause discovery engine 115. Although the administrator machine 110 is shown as a separate entity in IT environment 100, in other aspects, the administrator machine 110 may be a part of the root cause discovery engine 115 or a networked agent 105. The administrator machine 110 may provide an interface that provides the user with a view of operations data, identify user experience problems, or be alerted of user experience problems. The operations data may be provided with contextual information regarding various metrics and the historical values of the various metrics.

The user may also select certain metrics, events, or user experience problems to get a deeper dive into the data associated with the metrics, events, or problems. For example, the interface may notify the user that a user experience problem has occurred. The user may select the user experience problem to view more data associated with the user experience problem. The administrator machine 110 may transmit an indication of the user experience problem to the root cause discovery engine 115 where the root cause discovery engine 115 can identify one or more candidate causes or actual causes. The root cause discovery engine 115 may transmit the one or more causes back to the administrator machine 110 where they can be displayed to the user in the interface along with any contextual information that may help the user understand the information. The interface may also provide guidance for how to address the one or more causes and/or resolve the user experience problem.

The various entities in the IT environment 100 may communicate with one another via a network 150. The network 150 can be any type of network and may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Network 150 can be a public network, a private network, or a combination thereof. Communication network 150 may be implemented using any number of communications links associated with one or more service providers, including one or more wired communication links, one or more wireless communication links, or any combination thereof. Additionally, network 150 can be configured to support the transmission of data formatted using any number of protocols.

Figure 4:
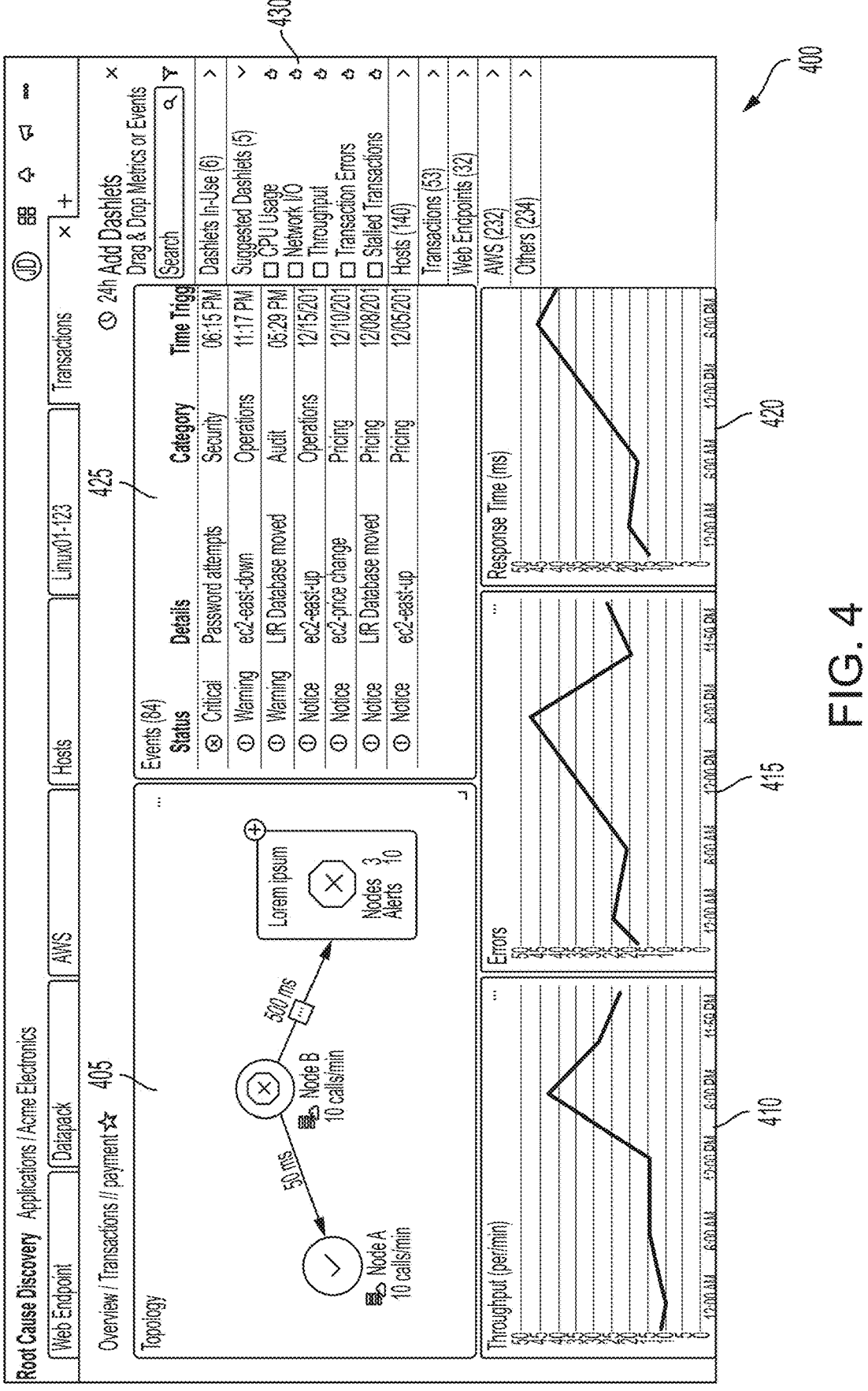
FIG. 4 is an illustration showing an example interface, in accordance with various aspects of the subject technology.

FIG. 4 is an illustration showing an example interface 400, in accordance with various aspects of the subject technology. The interface 400 may be displayed by the administrator machine 110 and include information about a user experience problem 405, various metrics 410, 415, and 420 associated with the user experience problem, various events associated 425 with the user experience problem, and one or more causes of the user experience problem 430. The user may select one or more of the displayed causes to view additional information with respect to the selected cause.

Figure 5:
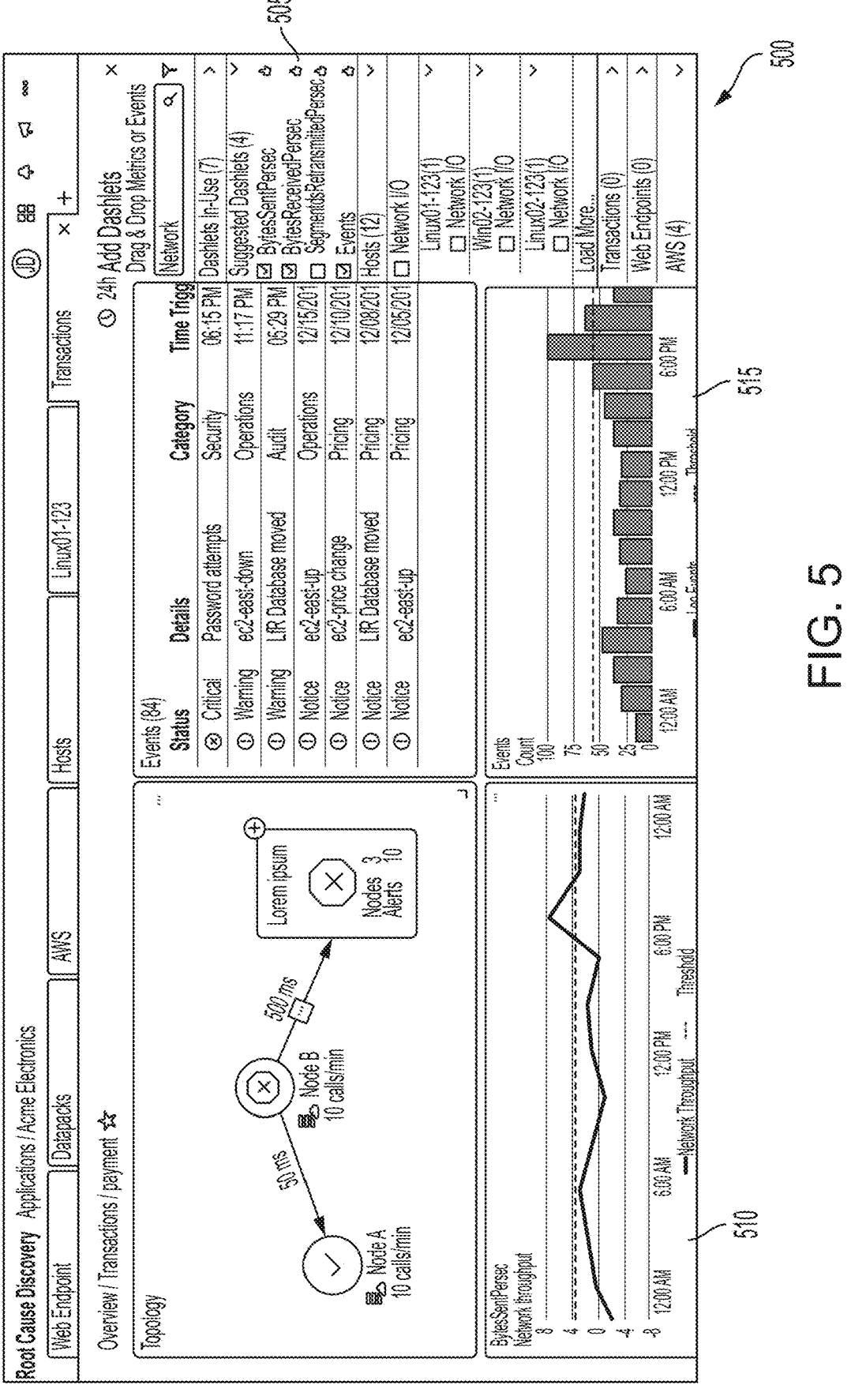
FIG. 5 is an illustration showing an example interface, in accordance with various aspects of the subject technology.

For example, FIG. 5 is an illustration showing an example interface 500, in accordance with various aspects of the subject technology. The user has selected 3 causes in interface component 505. The selection of each of the causes leads to information about each cause being displayed in the interface 500. For example, interface component 510 includes a chart of the bytes sent per second over time, which corresponds to the first selected cause. Interface component 515 includes a chart of a number of events detected over time, which corresponds to the third selected cause. An interface component for the second selected cause is not shown in FIG. 5 but may be further down in the interface 500.

Figure 6:
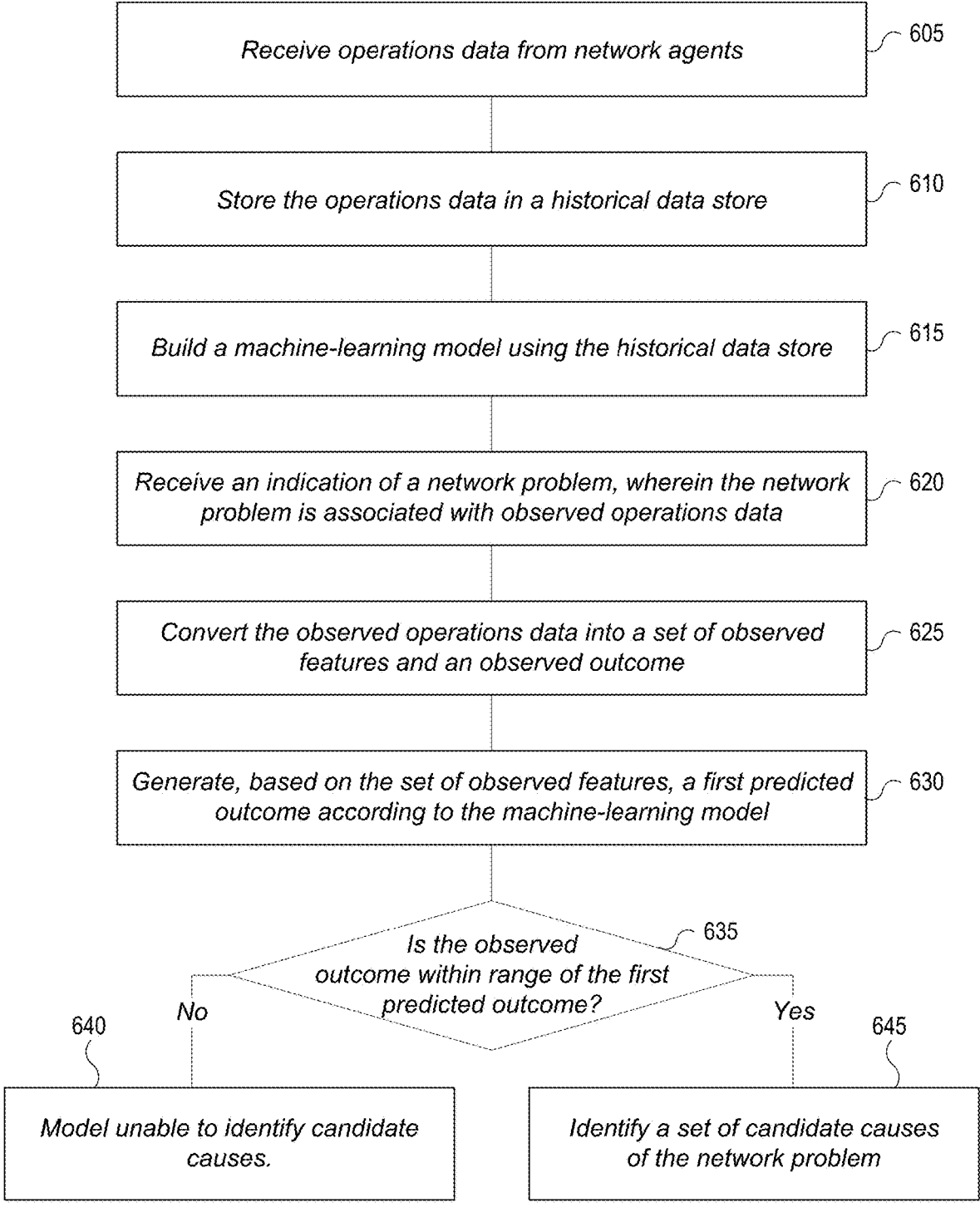
FIG. 6 shows an example process for identifying causes of a user experience problem, in accordance with various embodiments of the subject technology.

FIG. 6 shows an example process 600 for identifying causes of a user experience problem, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 600 can be performed by a system such as, for example, the root cause discovery engine 115 of FIG. 1 or similar network entity.

At operation 605, the system may receive operations data from one or more networked agents in the IT environment and store the operations data in a historical data store at operation 610. Using the operations data stored in the historical data store, the system may build a machine learning model at operation 615.

The machine learning model may be configured to identify correlations between different signals in the operations data such that the model may be used to identify one or more causes of an outcome such as a user experience problem. According to some aspects of the subject technology, the system may use various regression analysis or statistical analysis techniques to determine relationships among various metrics, events, or conditions. The regression analysis techniques may include linear regression, least squares regression, nonparametric regression, nonlinear regression, or a combination of techniques. Alternatively or additionally, the system may also use various machine learning techniques to identify correlations between different signals in the operations data. The techniques may include, but are not limited to, association rule learning, artificial neural networks, Bayesian networks, clustering, supervised learning, unsupervised learning, or a combination of techniques.

According to some aspects, a set of features may be extracted from the operations data. The operations data may be converted into features that are in the form of binary values such that generating correlations between different signals in the operations data becomes a binary classification process. For example, one or more of the metrics may be compared to an appropriate threshold. If a metric is greater than or equal to the threshold, the metric may be converted into a feature value of one. If the metric is less than the threshold the metric may be converted into a feature value of zero.

Events may also be converted into binary feature values based on whether or not the event occurs or whether the event occurs within a particular time period. If the event occurs, the feature value corresponding to the event is one. If the event does not occur, the feature value for the corresponding event is zero. Events may also be first converted into metrics, compared to threshold, and subsequently converted into feature values. For example, a number of events of a particular type that occur within a time period may be counted and compared to a threshold number. If the number of events is greater or equal to the threshold number, the metric may be converted into a feature value of one. If the number of events is less than the threshold number, the metric may be converted into a feature value of zero.

The various thresholds used to extract feature values may be, average values, moving averages, maximum allowable values, minimum allowable values, or calculated by some other means. Although various aspects discuss converting the operations data into binary feature values, in other aspects, other non-binary future values and other classification processes may be used.

Various machine learning techniques may use the extracted feature values to generate a machine learning model configured to identify correlations between the feature values. According to various aspects, a dependency graph may also be used to filter out correlations that may not be causes or factors for related features.

At operation 620, the system may receive an indication of a user experience problem. The indication of the user experience problem may be received from a user via, for example, an interface on an administrator machine or by being detected by the system or other network entity in the IT environment. The user experience problem may be associated with observed operations data which includes operations data observed at or around the same time period that the user experience problem occurred.

At operation 625 the observed operations data may be converted by the system into a set of observed features and an observed outcome. The set of observed features and the observed outcome may correspond to the features extracted from the operations data. Furthermore the observed outcome may correspond to the user experience problem. For example, one user experience problem may be a slow response time for an e-commerce website and be more specifically defined as a response time for the e-commerce website greater than 500 ms. If a slow response time for the website is detected, the system may access the observed operations data and convert the data into observed features and an observed outcome which includes the actual response time that was observed. If the actual response time in this scenario is 842 ms, the system may convert the data into a corresponding observed outcome value of 1, which signifies that the response time is greater than the threshold of 500 ms.

At operation 630, the system may input the set of observed features into the machine learning model and generate a first predicted outcome which represents what the observed outcome should be according to the model. The machine learning model may also output a set of candidate causes of the user experience problem and a corresponding weight for each of the candidate causes. At operation 635, the first predicted outcome may be compared to the observed outcome to validate whether the model correctly predicted the observed outcome.

If the observed outcome is not within range of the first predicted outcome, the model is incorrectly predicted the outcome. This indicates that something outside the norm occurred, something that was not encountered before in the operations data stored in historical data store occurred, or something the model cannot account for occurred. Accordingly, the system may notify the user that the model is unable to identify the cause of the user experience problem at operation 640 or rely on other root cause analysis methods to determine the cause.

If the observed outcome equals or is within range of the first predicted outcome, the model is validated and correctly predicted the outcome. Accordingly, the set of candidate causes provided by the model may be identified as the set of candidate causes of the user experience problem at operation 645. One or more candidate causes may be provided to the user, for example, in an interface on an administrator machine. The candidate causes may be provided along with their corresponding weights. According to some aspects, the system may perform additional steps to identify a best or actual cause of the user experience problem.

Figure 7:
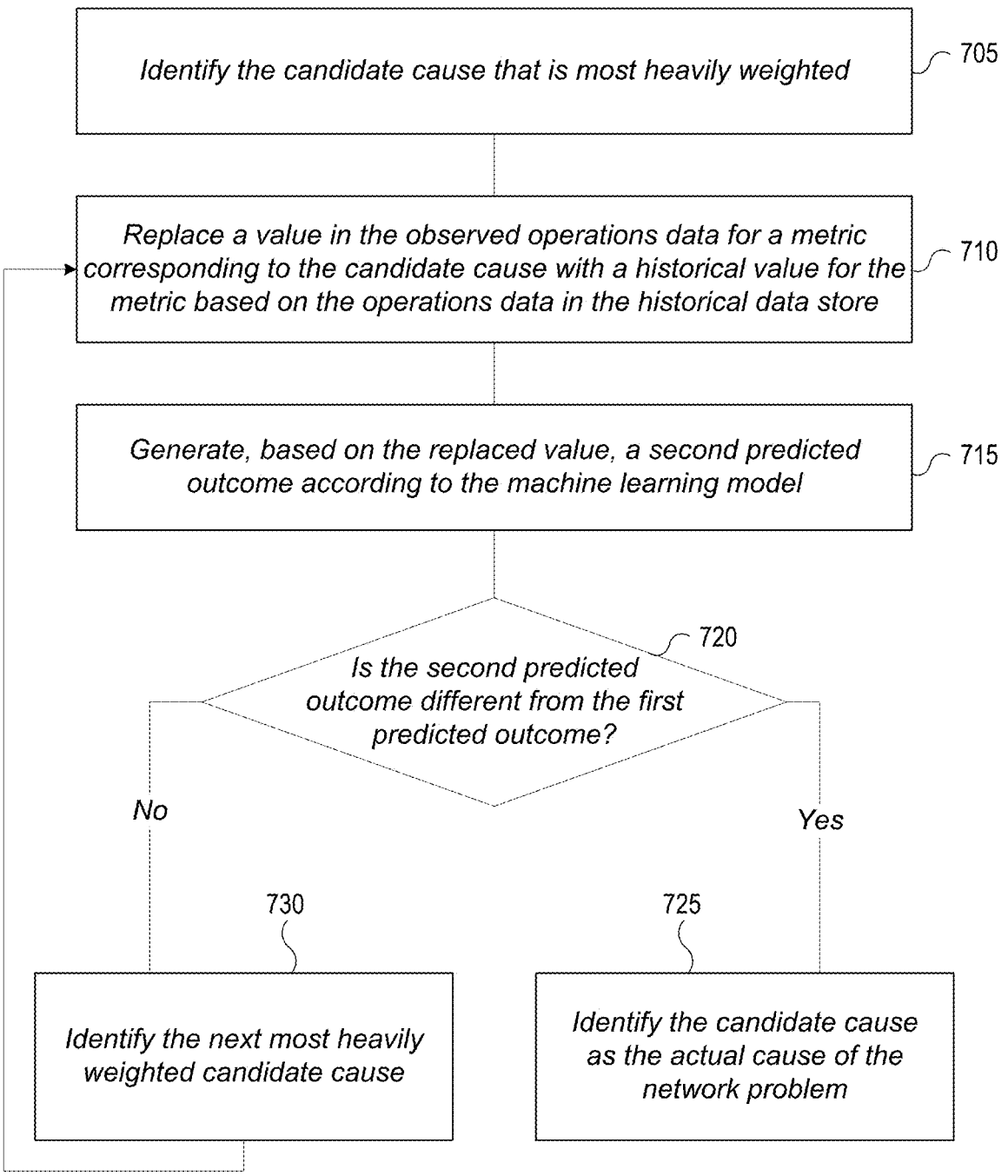
FIG. 7 shows an example process for a cause of a user experience problem, in accordance with various embodiments of the subject technology.

FIG. 7 shows an example process 700 for a cause of a user experience problem, in accordance with various embodiments of the subject technology. In process 700, the system may perform additional steps to identify an actual cause of the user experience problem, according to the machine learning model. According to some aspects, the process 700 may begin after the system has identified a set of candidate causes of the user experience problem using the machine learning model in operation 645 of FIG. 6.

Each of the candidate causes provided by the machine learning model may correspond to a metric or event that, according to the machine learning model, is correlated to the user experience problem. Furthermore, the machine learning model assigns each candidate cause a weight. At operation 705, the system may identify the candidate cause that is most heavily weighted.

At operation 710, the value in the observed operations data for the metric corresponding to the candidate cause that is most heavily weighted is replaced in the machine learning model by a historical value for the metric calculated based on the operations data in the historical data store. The historical value for the metric may be a normalized value for the metric calculated based on an average, median, or range for that metric calculated based on the historic operations data. For example, the normalized value may be an average value for the metric at times and days that are similar to the time and day associated with the observed operations data.

At operations 715, the system generates a second predicted outcome according to the machine learning model based on the modified observed operations data that includes the historical value in place of the observed value for the metric. At operation 720, the system determines whether the predicted outcome has changed based on the replaced value or, in other words, the second predicted outcome is different from the first predicted outcome.

If the second predicted outcome is different from the first predicted outcome, it is likely that the candidate cause is the actual cause of the user experience problem. In other words, if changing the value of that metric from the observed value to a normalized value causes the model to predict a different outcome, the observed value of the metric is most likely the cause of the observed outcome. Accordingly, at operation 725, the system identifies the candidate cause as an actual cause of the user experience problem when the second predicted outcome is different from the first predicted outcome.

If the second predicted outcome is not different from the first predicted outcome, it is likely that the candidate cause is not the actual cause of the user experience problem. Accordingly, at operation 730, the system identifies the candidate cause as not an actual cause of the user experience problem.

The actual cause may be provided to the user in an interface on an administrator machine along with information related to the actual cause and/or the user experience problem, guidance on how to resolve the user experience problem based on the actual cause, and/or tips or resources on how to handle the user experience problem or reduce future occurrences of the user experience problem.

According to some aspects of the subject technology, in order to improve the accuracy and robustness of the machine learning model, the observed operations data may be added to the historical data store and used to update and reinforce the machine learning model.

According to various aspects of the subject technology, the machine learning model is further able to produced one or more ranked lists of contributing factors to user experience problems. Each ranked list may be used to identify problem areas in the IT stack, identify areas to fix, or identify areas to invest additional resources.

For example, a process for producing the ranked list of causes of a user experience problem may include receiving operations data from one or more networked agents in the IT environment and storing the operations data in a historical data store. Using the operations data stored in the historical data store, the system may build a machine learning model.

The machine learning model may be configured to identify correlations between different signals in the operations data such that the model may be used to identify one or more causes of an outcome such as a user experience problem. According to some aspects, a set of features may be extracted from the operations data. The operations data may be converted into features that are in the form of binary values such that generating correlations between different signals in the operations data becomes a binary classification process. For example, one or more of the metrics may be compared to an appropriate threshold. If a metric is greater than or equal to the threshold, the metric may be converted into a feature value of one. If the metric is less than the threshold the metric may be converted into a feature value of zero.

Events may also be converted into binary feature values based on whether or not the event occurs or whether the event occurs within a particular time period. If the event occurs, the feature value corresponding to the event is one. If the event does not occur, the feature value for the corresponding event is zero. Events may also be first converted into metrics, compared to threshold, and subsequently converted into feature values. For example, a number of events of a particular type that occur within a time period may be counted and compared to a threshold number. If the number of events is greater or equal to the threshold number, the metric may be converted into a feature value of one. If the number of events is less than the threshold number, the metric may be converted into a feature value of zero.

Various machine learning techniques may use the extracted feature values to generate a machine learning model configured to identify correlations between the feature values. These correlations may be weighted and used to generate a ranked list of correlated features for any target feature, where the target feature may be defined as a user experience problem.

Figure 8A:
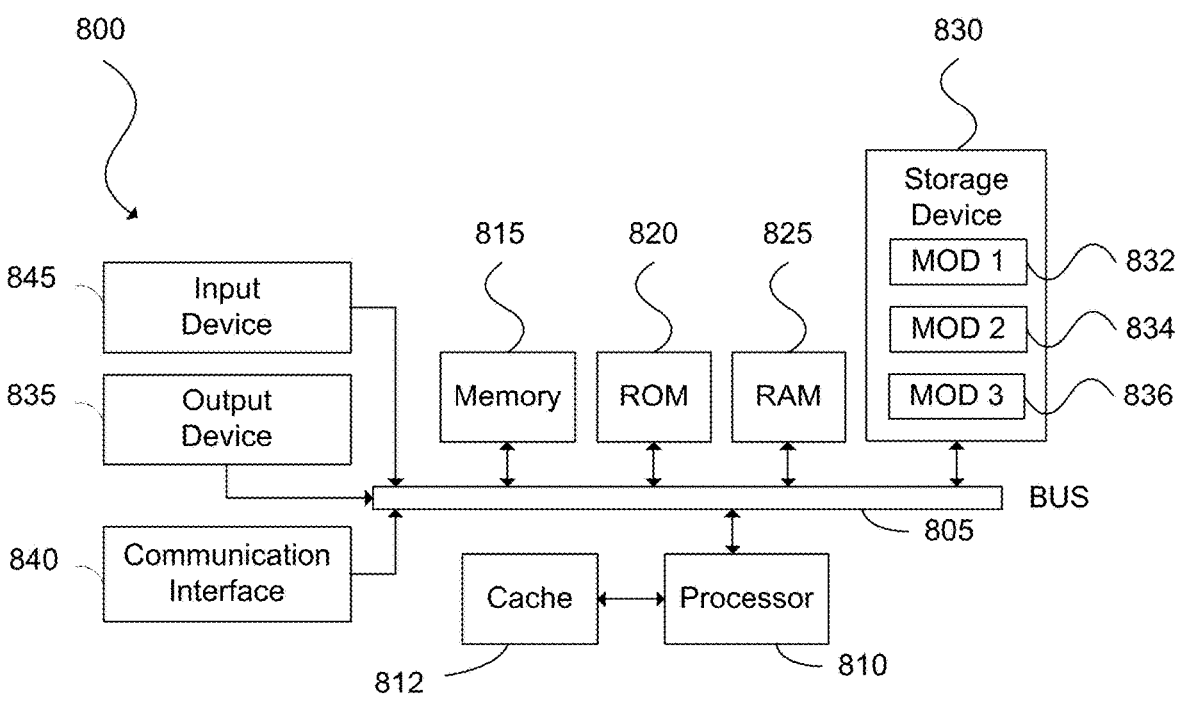
FIGS. 8A and 8B illustrate examples of systems in accordance with some embodiments.
Figure 8B:
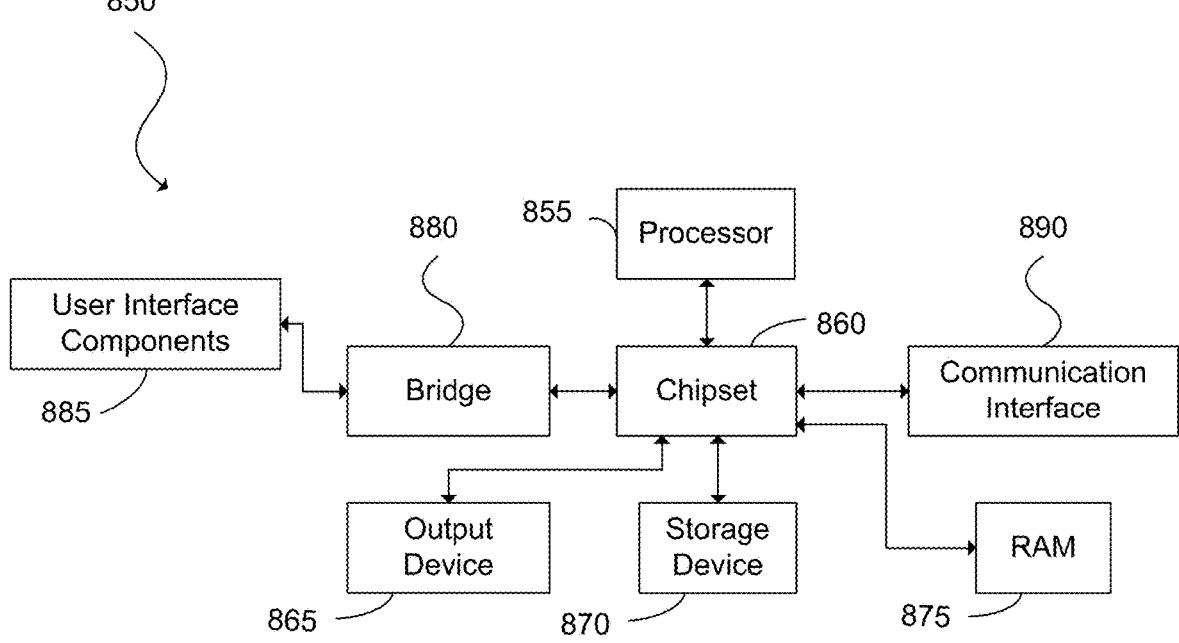

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example architecture for a conventional bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) in a storage device 820 and random access memory (RAM) 825, to the processor 810. The computing system 800 can include a cache 812 of high-speed memory connected directly with, in close proximity to, or integrated as part of the processor 810. The computing system 800 can copy data from the memory 815 and/or the storage device 830 to the cache 812 for quick access by the processor 810. In this way, the cache 812 can provide a performance boost that avoids processor delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, output device 835, and so forth, to carry out the function.

FIG. 8B illustrates an example architecture for a conventional chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, and solid state media, for example. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks.

Some applications of the methods for generating, displaying, and using the GUI disclosed herein can include receiving ordered datasets over the physical interface or be generated by the machine itself by processor 855 analyzing data stored in the storage device 870 or the RAM 875. Further, the computing system 800 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. Method comprising:

receiving, at a first time, first operations data including a first plurality of metrics from a plurality of network entities in a network system;

storing information from the first operations data in a data store;

building one or more machine learning models using the stored information from the first operations data, the machine learning model based on a plurality of historical values, each historical value corresponding to one or more of the first plurality of metrics, wherein the one or more machine learning models identifies a historical value range for each metric in the plurality of metrics;

receiving, at a second time after the first time, second operations data including a second plurality of metrics from the plurality of network entities;

using the one or more machine learning models built using the stored information from the first operations data to detect a user experience problem using information from the second operations data as input;

identifying a plurality of candidate causes for the user experience problem, wherein each candidate cause of the plurality of candidate causes is associated with at least one correlated metric from the second plurality of metrics, wherein the at least one correlated metric from the second plurality of metrics has at least one value that deviates from the historical value range identified by the one or more machine learning models for that metric;

creating alternative operations data by substituting a value from the historical value range for the at least one correlated metric in the second plurality of metrics, the substituted value replacing the value that deviates from the historical value range;

evaluating the plurality of candidate causes according to their likelihood of solving the user experience problem by using the one or more machine learning models with information from the alternative operations data as input; and visually presenting information about the user experience problem, wherein the visually presented information includes at least one root cause from the plurality of candidate causes, wherein the at least one visually presented root cause is selected using the evaluation of the one or more machine learning model.

2. The method of claim 1, wherein the one or more machine learning models include at least one machine learning model configured to identify correlations between at least one metric in the stored plurality of historical values and an outcome, wherein the outcome is a user experience problem.

3. The method of claim 1, wherein the one or more machine learning models are configured to use reinforcement learning to update at least one machine learning model.

4. The method of claim 1, further comprising visually presenting guidance on how to resolve the user experience problem.

5. The method of claim 1, wherein the user experience problem is correlated with a key performance indicator (KPI).

6. The method of claim 1, further comprising using a supervised learning technique on the stored information from the first operations data.

7. The method of claim 1, further comprising using a clustering technique on the information from the first and/or second operations data.

8. The method of claim 1, wherein at least one of the one or more machine learning models is configured to use a regression technique.

9. A system comprising:

one or more processors; and one or more computer-readable non-transitory storage media coupled to the one or more processors and comprising instructions that, when executed by the one or more processors, cause one or more hosts to perform operations comprising:

receiving, at a first time, first operations data including a first plurality of metrics from a plurality of network entities in a network system;

storing information from the first operations data in a data store;

using a modeling engine to build at least one machine learning model using the stored information from the first operations data, the at least one machine learning model based on a plurality of historical values, each historical value corresponding to one or more of the first plurality of metrics, wherein the at least one machine learning model identifies a historical value range for each metric in the plurality of metrics;

receiving, at a second time after the first time, second operations data including a second plurality of metrics from a plurality of networked devices;

using the at least one machine learning model built using the stored information from the first operations data to detect a user experience problem using the information from the second operations data as input;

creating alternative operations data by substituting a value from the historical value range for the at least one correlated metric in the second plurality of metrics, the substituted value replacing the value that deviates from the historical value range;

identifying a plurality of candidate causes for the user experience problem, wherein each candidate cause is associated with at least one correlated metric from the second plurality of metrics, wherein the at least one correlated metric from the second plurality of metrics has at least one value that deviates from the historical value range identified by the modeling engine for that metric;

evaluating the plurality of candidate causes according to their likelihood of solving the user experience problem by using the at least one machine learning model with information from the alternative operations data as input; and visually presenting information about the user experience problem, wherein the visually presented information includes at least one root cause from the plurality of candidate causes; wherein the at least one visually presented root cause is selected using the evaluation of the at least one machine learning model.

10. The system of claim 9 wherein the at least one machine learning model includes a machine learning model configured to identify correlations between at least one metric in the stored plurality of historical values and an outcome.

11. The system of claim 9 wherein the at least one machine learning model is configured to use reinforcement learning to update a machine learning model.

12. The system of claim 9 wherein the operations further comprise including visually presenting guidance on how to resolve the user experience problem.

13. The system of claim 9 wherein the user experience problem is correlated with a key performance indicator (KPI).

14. The system of claim 9 wherein the operations further comprise using a supervised learning technique on stored information from the first operations data.

15. The system of claim 9 wherein the operations further comprise using a clustering technique on information from the first and/or second operations data.

16. The system of claim 9 wherein the operations further comprise using a regression technique.

17. One or more computer-readable non-transitory storage media comprising instructions that, when executed by one or more processors associated with one or more hosts, cause one or more hosts to perform operations comprising:

receiving, at a first time, first operations data including a first plurality of metrics from a plurality of network entities in a network system;

storing information from the first operations data in a data store;

using a modeling engine to build at least one machine learning model using the stored information from the first operations data, the at least one machine learning model based on a plurality of historical values, each historical value corresponding to one or more of the first plurality of metrics, wherein the at least one machine learning model identifies a historical value range for each metric in the plurality of metrics;

receiving, at a second time after the first time, second operations data including a second plurality of metrics from a plurality of networked devices;

using the at least one machine learning model built using the stored information from the first operations data to detect a user experience problem using the information from the second operations data as input;

identifying a plurality of candidate causes for the user experience problem, wherein each candidate cause is associated with at least one correlated metric from the second plurality of metrics, wherein the at least one correlated metric from the second plurality of metrics has at least one value that deviates from the historical value range identified by the at least one machine learning model for that metric;

creating alternative operations data by substituting a value from the historical value range for the at least one correlated metric in the second plurality of metrics, the substituted value replacing the value that deviates from the historical value range;

evaluating the plurality of candidate causes according to their likelihood of solving the user experience problem by using the at least one machine learning model with information from the alternative operations data as input; and visually presenting information about the user experience problem, wherein the visually presented information includes at least one root cause from the plurality of candidate causes; wherein the at least one visually presented root cause is selected using the evaluation of the at least one machine learning model.

18. The instructions of claim 17 wherein the at least one machine learning model includes a machine learning model configured to identify correlations between at least one metric in the stored plurality of historical values and an outcome.

19. The instructions of claim 17 wherein the at least one machine learning model is configured to use reinforcement learning to update a machine learning model.

20. The instructions of claim 17 wherein the operations further comprise including visually presenting guidance on how to resolve the user experience problem.

21. The instructions of claim 17 wherein the user experience problem is correlated with a key performance indicator (KPI).

22. The instructions of claim 17 wherein the operations further comprise using a supervised learning technique on stored information from the first operations data.

23. The instructions of claim 17 wherein the operations further comprise using a clustering technique on information from the first and/or second operations data.

24. The instructions of claim 17 wherein the operations further comprise using a regression technique on information from the first and/or second operations data.

* * * * *